United States Patent [19]

Kutschenreuter, Jr. et al.

[11] Patent Number: 5,082,206
[45] Date of Patent: Jan. 21, 1992

[54] HYPERSONIC FLIGHT VEHICLE

[75] Inventors: Paul H. Kutschenreuter, Jr.; Jon M. Vishnauski, both of Loveland, Ohio

[73] Assignee: General Electric Company, Cincinnati, Ohio

[21] Appl. No.: 223,826

[22] Filed: Jul. 25, 1988

[51] Int. Cl.$^5$ .......................... B64D 33/02; F02C 7/04
[52] U.S. Cl. .................................. 244/53 B; 60/270.1
[58] Field of Search ............................ 244/53 B, 35 A; 60/270.1; 137/15.1

[56] References Cited

U.S. PATENT DOCUMENTS

| | | |
|---|---|---|
| 3,027,118 | 3/1962 | Willox ............... 244/53 B |
| 3,041,827 | 7/1962 | Ferri ................. 244/53 B |
| 3,161,379 | 12/1964 | Lane .................. 244/53 B |
| 4,194,519 | 3/1980 | Baker et al. ....... 244/53 B |

FOREIGN PATENT DOCUMENTS 911074 11/1962 United Kingdom .
1050923 12/1966 United Kingdom .

OTHER PUBLICATIONS

AGARD Hypersonic Boundary Layers and Flow Fields (May 1968), "Experimental Investigations of Wave Riders in the Mach Number Range from 8 to 15" by K. Kipke.

Popular Science, (Apr. 1986), "Scramjets That Will Reach Mach 25", by T. A. Heppenheimer.
Aviation Week, 3/7/88, pp. 36–43 (X-30).
Aviation Week, 8/11/86, pp. 70–71 (Germany's "Sanger").
Flight International, 9/13/86, p. 16 and 3/1/86, pp. 38–39.
Aviation Week, 8/18/86, p. 27.
Aviation Week, 4/14/86, pp. 24–25.
Aviation Week, 4/14/86, p. 117.

Primary Examiner—Joseph F. Peters, Jr.
Assistant Examiner—Rodney Corl
Attorney, Agent, or Firm—Douglas E. Erickson; Jerome C. Squillaro

[57] ABSTRACT

A hypersonic inlet and a hypersonic engine and flight vehicle having such an inlet. The three-dimensionally-swept inlet has an upper member with a caret-shaped lower surface portion producing a two-dimensional wedge flow below such lower surface portion. The inlet also has a lower member having two inverted and transposed semi-caret-shaped upper surface portions producing a two-dimensional wedge flow above such upper surface portions. An inlet aft portion connects together the upper and lower members and has an orifice defining the engine inlet throat which at least partially receives the two-dimensional flows.

10 Claims, 2 Drawing Sheets

HYPERSONIC FLIGHT VEHICLE

The U.S. Government has rights in this invention pursuant to a contract between the U.S. Government and the General Electric Company.

BACKGROUND OF THE INVENTION

The present invention relates generally to flight vehicles and more particularly to an inlet for a hypersonic flight vehicle engine.

At hypersonic Mach numbers (i.e., greater than Mach 5) a flight vehicle having an air breathing engine requires an engine inlet having a large air-capture region. In addition, hypersonic flight vehicle engine design requires inlet surfaces to be three-dimensionally-swept to reduce aerodynamic drag and friction heating. Three-dimensionally-swept engine inlet designs can produce non-planar flow components requiring a complex and perhaps impractical analysis of a three-dimensional airflow path. This may be contrasted with non-hypersonic supersonic engines having ramp inlet surfaces producing planar flow components allowing a much easier analysis of a two-dimensional airflow path. Furthermore, two-dimensional flow allows easier direct connect engine component testing (which means testing an engine component by duplicating its input conditions with some apparatus without having to use the upstream engine components to produce such input conditions), such as testing an engine without its large inlet by duplicating the two-dimensional airflow conditions calculated at the engine throat. Finally, a hypersonic engine design may introduce a pitch moment on the flight vehicle which would require a constant trim such as from a drag-producing control surface.

In describing the invention, the terminology "caret-shaped surface" will be used. For the purpose of this invention, a "caret-shaped surface" is defined as the surface of an isosceles triangle which has been folded along its base altitude line to form two mirror-image right triangles which meet along the altitude line with an anhedral angle. To help visualize this caret-shaped surface, one can cut an isosceles triangle out of a piece of stiff paper, and crease the triangle along the altitude line so that two mirror-image right triangles are superimposed on each other. (The steps up to now are identical to the beginning steps in making certain paper airplanes.) If the bent isosceles triangle is placed on the surface of a table, so that the legs of the isosceles triangle rest on the table surface, the two right triangle portions will form an anhedral angle at the altitude line. The lower (inside) surface of the bent isosceles triangle is a caret-shaped surface. The angle between the altitude line (the crease line) and the airflow is the angle of attack of the caret-shaped surface.

For unique combinations of hypersonic speed and angle of attack (hereinafter referred to as "predetermined operating conditions"), as can be determined by those skilled in the art, the above-defined caret-shaped surface will generate a plane shock wave in the plane of its leading edges (the plane containing the legs of the bent isosceles triangle which is also the plane of the table surface) which leads to a uniform pressure between the shock wave and the caret-shaped surface (the lower surface of the bent isosceles triangle) equal to the pressure behind the shock in a two-dimensional wedge flow. Two-dimensional wedge flow will be closely approximated for deviations from the design hypersonic speed and angle of attack.

The caret-shaped surface of the invention is the same as the lower surface of the caret wing of the literature. Caret wings are described in a paper by K. Kipke entitled "Experimental Investigations of Wave Riders in the Mach Number Range from 8 to 15" published in *AGARD Hypersonic Boundary Layers and Flow Fields* (May, 1968), said paper hereby incorporated by reference.

SUMMARY OF THE INVENTION

It is an object of the invention to provide a flight vehicle engine inlet having a large air-capture region.

It is another object of the invention to provide a hypersonic flight vehicle engine inlet which is three-dimensionally swept yet provides two-dimensional flow.

It is a further object of the invention to provide a hypersonic flight vehicle engine which provides a generally zero pitch moment.

It is an additional object of the invention to provide a hypersonic flight vehicle with an engine which provides the vehicle with pitch maneuvering control.

In a first embodiment, the flight vehicle engine inlet of the invention includes a first member, a second member, and an aft portion. The first and second members each have at least a partial generally caret-shaped surface portion and are positioned to generally oppose each other across a capture region which at least partially includes the two-dimensional wedge flows produced by such caret surface portions. The aft portion joins the first and second members and has an orifice forming the throat of the engine inlet.

In a second embodiment, the hypersonic flight vehicle engine inlet of the invention includes an upper member, a lower member, and an aft portion. The upper member has a generally caret-shaped lower surface portion. The lower member has two inverted and transposed generally semi-caret-shaped upper surface portions. The aft portion connects the upper and lower members and has an orifice forming the throat of the engine inlet.

In a third embodiment, the hypersonic flight vehicle engine of the invention includes the inlet of the previously-described second embodiment, a combustion chamber, fuel injectors, and an exhaust nozzle. The fuel injectors are positioned in the combustion chamber, and the combustion chamber is serially connected to the inlet's aft portion. The exhaust nozzle is serially connected to the combustion chamber and has generally symmetric upper and lower segments.

In a fourth embodiment, the hypersonic flight vehicle of the invention includes the engine of the previously-described third embodiment and two swept wings attached to the engine inlet's lower member with the exhaust nozzle's upper and lower segments each having an aft flap for pitch maneuvering control and with the wings each having a mechanism for yaw and roll maneuvering control.

Several benefits and advantages are derived from the invention. The caret and semi-caret inlet surfaces provide a three-dimensionally-swept and large air-volume-capturing hypersonic engine inlet which produces two-dimensional wedge flow. This allows easier analysis of a two-dimensional airflow path and easier direct connect engine component testing. The symmetric upper and lower exhaust nozzle segments provide generally zero pitch moment. The aft flaps on the exhaust nozzle's upper and lower segments provide an engine which provides pitch maneuvering control.

BRIEF DESCRIPTION OF THE DRAWINGS

The accompanying drawings illustrate several embodiments of the present invention wherein.

DETAILED DESCRIPTION OF THE INVENTION

Figure 1:
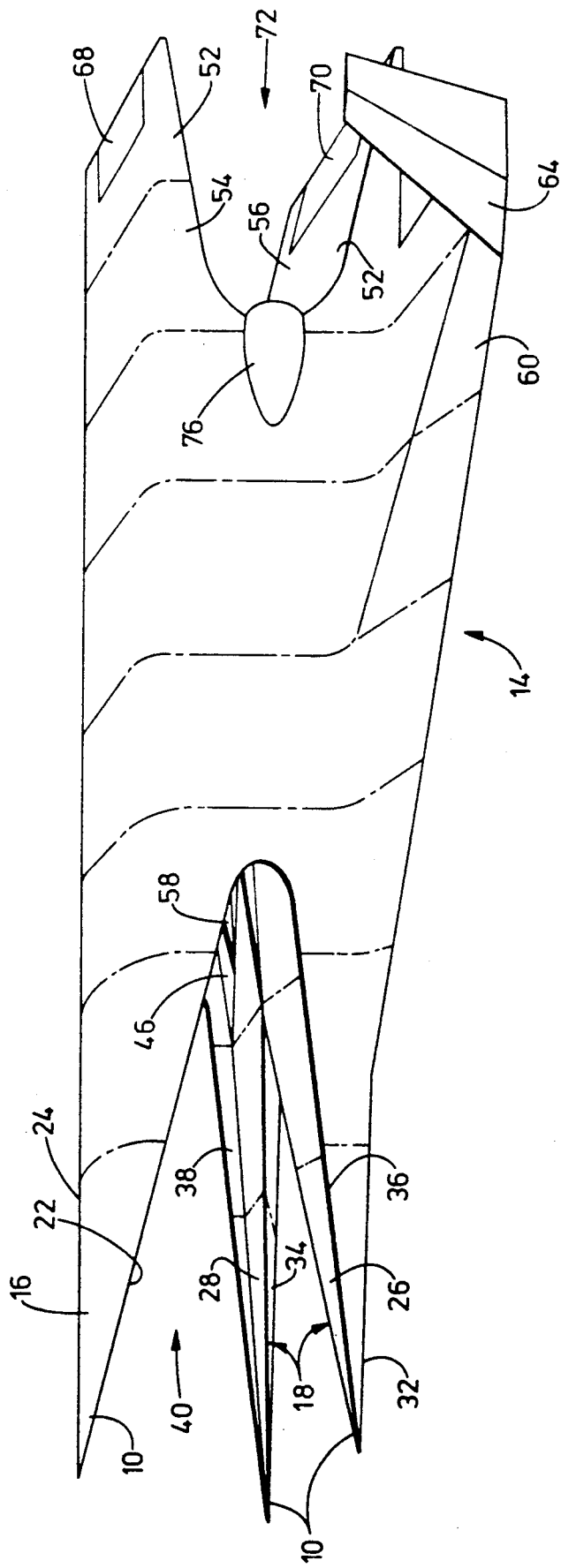
FIG. 1 is a perspective view of the hypersonic flight vehicle including its engine inlet.
Figure 2:
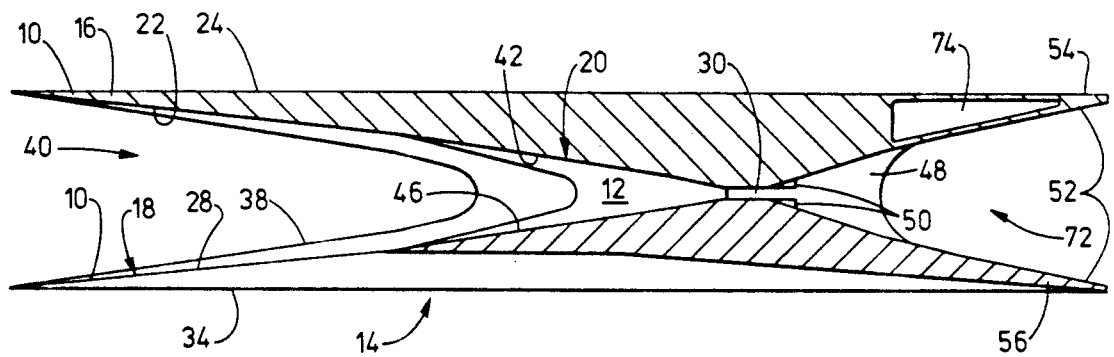
FIG. 2 is a cross-sectional side view of the hypersonic engine.
Figure 3:
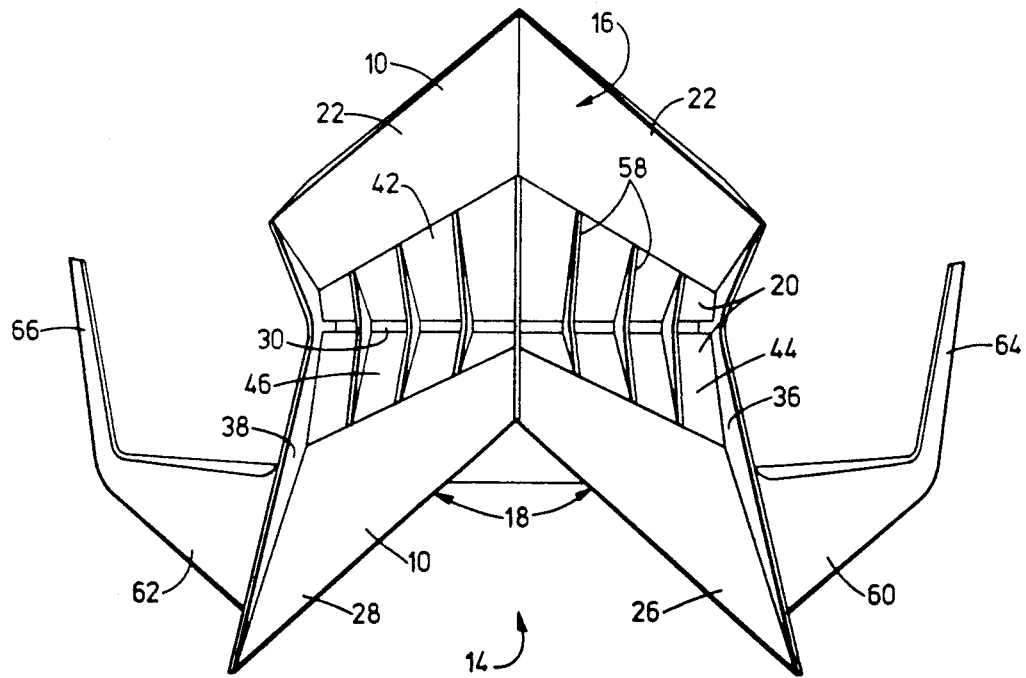
FIG. 3 is a front elevational view in perspective of the hypersonic flight vehicle.

The present invention, as embodied in an engine inlet 10, a hypersonic engine 12, and a flight vehicle 14, is illustrated in FIGS. 1 through 3. The flight vehicle engine inlet 10 is designed for hypersonic operation and includes a first or upper member 16, a second or lower member 18 (preferably, but not necessarily, having two upper surface portions 26 and 28 to be described later), and an aft portion 20.

The inlet upper member 16 has a generally caret-shaped lower surface portion 22 and a contoured upper surface 24. The caret-shaped lower surface portion 22 has the shape of the lower surface of a caret wing. As is known to those skilled in the art, the three-dimensionally swept lower surface of a caret wing will produce a two-dimensional wedge flow below such lower surface at predetermined operating conditions of angle of attack and hypersonic speed (typically chosen as the vehicle's cruise speed). The upper surface 24 of the engine inlet 10 also serves as part of the vehicle's fuselage, and between the upper surface 24 and the caret-shaped lower surface portion 22 of the engine inlet 10 may be located the cockpit (for a manned vehicle) and at least part of a payload bay.

The inlet lower member 18 has two inverted and transposed generally semi-caret-shaped upper surface portions 26 and 28 defined as follows: invert (turn upside down) the lower surface of a caret wing to produce a caret-shaped upper surface, then longitudinally cut this surface in half to produce two (mirror-image) semi-caret-shaped upper surfaces, and then transpose (switch positions without rotation) the two semi-caret-shaped upper surfaces. The three-dimensionally swept semi-caret-shaped upper surface portions 26 and 28 will produce a two-dimensional wedge flow above such surface portions at predetermined operating conditions of angle of attack and hypersonic speed (chosen to be equal to the angle of attack and hypersonic speed chosen for the design of the caret-shaped lower surface portion 22 of the inlet upper member 16), as can be appreciated by those skilled in the art. In an exemplary embodiment, the caret-shaped lower surface portion 22 and the semi-caret-shaped upper surface portions 26 and 28 are disposed and oriented to equally compress their respective two-dimensional flows at the throat 30 at the predetermined hypersonic speed. Preferably, each semi-caret-shaped upper surface portion 26 and 28 of the inlet lower member 18 is created from an inverted and transposed longitudinally-cut-half of the caret-shaped lower surface portion 22 of the inlet upper member 16. The semi-caret-shaped upper surface portions 26 and 28 are joined inboard to corresponding contoured lower surface portions 32 and 34 of the inlet lower member 18, such lower surface portions also serving as part of the vehicle's fuselage and between such upper and lower surface portions may be located at least part of the landing gear. The upper surface portions 26 and 28 and the lower surface portions 32 and 34 are joined outboard to corresponding generally-vertical raised ramp portions 36 and 38 which help to control the amount of inlet air lost to side spillage during off-design operation at lower Mach numbers.

The inlet aft portion 20 connects together the upper 16 and lower 18 inlet members and has an orifice defining the throat 30 of the engine inlet 10. The throat 30 receives at least a portion of the two dimensional wedge flows produced by the inlet upper 16 and lower 18 members. The upper 16 and lower 18 inlet members are seen to generally oppose each other across an air capture region 40 which is large in relation to the relative size of the vehicle 14. A large capture area is needed at high speeds. At lower speeds, at least some of the unneeded portion of the inlet air is naturally spilled out the open side and bottom portions of the engine inlet 10 reducing the need for an engine with a variable forward inlet geometry.

For added compression needed at higher speeds, the aft portion 20 of the engine inlet 10 also includes an upper transition ramp 42 and two lower transition ramps 44 and 46. The upper transition ramp 42 extends from the caret-shaped lower surface portion 22 of the inlet upper member 16 downward and aft terminating at the throat 30. The lower transition ramps 44 and 46 (which may be integrally combined into a single ramp) extend from a corresponding semi-caret-shaped upper surface portion 26 and 28 of the inlet lower member 18 upward and aft terminating at the throat 30. The transition ramps, as can be appreciated by those skilled in the art, turn the two-dimensional flow from the corresponding caret or semi-caret surface without affecting its two-dimensional nature. The transition ramps not only add compression but also allow the inlet throat 30 to have a rectangular design shape which simplifies analysis and testing. A rectangular throat geometry also interfaces efficiently with the downstream combustor portion 48 of the engine. Preferably, the transition ramps are movable to adjust the height of the rectangular-shaped throat. Having a variable-area rectangular throat allows adjustment for different compression ratios needed by the engine at different speeds during the flight, such as increasing speed from Mach 5 to a speed of Mach 25 or 30. A variable-area rectangular throat also permits use of variable geometry in the combustor portion of the engine as might be desirable for operation over a wide range of flight Mach numbers.

The hypersonic engine 12, preferably is a ramjet, scramjet, hybrid or combined cycle or the like, and includes the previously-described inlet 10, a combustion chamber 48 serially connected to the inlet aft portion 20, a plurality of fuel injectors 50 disposed in the combustion chamber 48, and an exhaust nozzle 52 serially connected to the combustion chamber 48. The exhaust nozzle 52 has symmetric upper 54 and lower 56 segments which together produce generally zero pitch moment. The aft portion 20 of the engine inlet 10 preferably contains spaced-apart swept ribs 58. Such ribs 58 provide structural support and are located forward, proximate and across the width of the throat 30. Additional fuel injectors (not shown) are positioned in the inlet's aft portion 20, such as on the walls of the ribs 58 and/or in their aft-facing base regions.

The hypersonic flight vehicle 14 includes the previously-described engine 12 and two swept wings 60 and 62 attached to the inlet lower member 18. The wings 60 and 62 have means for yaw and roll vehicle maneuver control. Preferably such means include canted vertical fins 64 and 66. Other such means include roll-control flap portions in the wings plus vertical fins with yaw-control flap portions, reaction jets, and the like, as is known to those skilled in the art. Vehicle pitch maneuver control is provided by aft flaps 68 and 70 attached to the exhaust nozzle upper 54 and lower 56 segments. At hypersonic speeds, pitch maneuver control is achieved by turning an aft flap 68 or 70 inward into the nozzle exhaust region 72 as there may not be enough air pressure for vehicle control in turning an aft flap outward of the exhaust nozzle, especially if the outward region is in the "shadow" of the vehicle relative to the free air stream. As a hypersonic vehicle needs large quantities of fuel (as well as air), preferably conformal fuel tanks 74 are disposed at least partially within the exhaust nozzle 52.

Preferably, the hypersonic flight vehicle 14 takes off from a runway powered by take-off rockets 76 mounted on the sides of the exhaust nozzle 52. When sufficient speed is reached for ramjet or scramjet operation, the rockets 76 are shut down or expended, and the previously-described engine 12 takes over to power the flight vehicle 14 to hypersonic speeds. Other take-off means include the vehicle riding piggy-back on a large conventional-type supersonic aircraft or the vehicle having one or more turbojets in a combined or hybrid cycle design with the engine of the invention, as can be appreciated by those skilled in the art. When orbital operation of the flight vehicle 14 is desired, the rockets 76 may be reignited, if necessary, to help achieve final orbital velocity.

Typical design parameters, which have been subject to computer simulations, include a predetermined hypersonic speed of Mach 25, an inlet contraction (area) ratio of 30 to 1, transition ramp angles of from 5 to 11 degrees, and an inlet leading edge sweep angle of 77 degrees.

The foregoing description of several preferred embodiments of the invention has been presented for purposes of illustration. It is not intended to be exhaustive or to limit the invention in the precise form disclosed, and obviously many modifications and variations are possible in light of the above teaching. It is noted that the terms "upper" and "lower" are terms of convenience used to describe the elements of the engine inlet 10. For example, it is clear that the engine inlet 10 can be oriented, with respect to the rest of the hypersonic flight vehicle 14, at any pre-chosen angle about the vehicle's longitudinal axis. In a preferred embodiment of the hypersonic flight vehicle 14, the terms "upper" and "lower" describe the elements of the engine inlet 10 when the hypersonic flight vehicle 14 is in level flight. It is intended that the scope of the invention be defined by the claims appended hereto.

We claim:

1. A flight vehicle engine inlet comprising:
    (a) a first member having at least a partial generally caret-shaped surface portion for producing a first generally two-dimensional wedge flow;
    (b) a second member having at least a partial generally caret-shaped surface portion for producing a second generally two-dimensional wedge flow, wherein said first and second members are disposed to generally oppose each other across a capture region which at least partially includes said first and second two-dimensional wedge flows; and
    (c) an aft portion having an orifice defining an engine inlet throat and joining said first and second members such that said throat receives at least a portion of said first and second two-dimensional wedge flows.

2. A hypersonic flight vehicle engine inlet comprising:
    (a) an upper member having a generally caret-shaped lower surface portion for producing a first generally two-dimensional wedge flow below said lower surface portion;
    (b) a lower member having two inverted and transposed generally semi-caret-shaped upper surface portions for producing a second generally two-dimensional wedge flow above said upper surface portions; and
    (c) an aft portion connecting together said upper and lower members and having an orifice defining an engine inlet throat.

3. The engine inlet of claim 2, wherein said caret-shaped lower surface portion and said semi-caret-shaped upper surface portions are disposed and oriented such that said first and second two-dimensional wedge flows are generally equally compressed at said throat.

4. The engine inlet of claim 3, wherein each said semi-caret-shaped upper surface portion is defined by an inverted and transposed longitudinally-cut-half of said caret-shaped lower surface portion.

5. The engine inlet of claim 4, wherein said aft portion also includes an upper transition ramp extending from said caret-shaped lower surface portion downward and aft terminating at said throat and a lower transition ramp extending from each of said semi-caret-shaped upper surface portions upward and aft terminating at said throat.

6. The engine inlet of claim 3, wherein said throat has a generally rectangular shape.

7. The engine inlet of claim 6, wherein said upper and lower transition ramps are movable to adjust the height of said rectangular-shaped throat.

8. A hypersonic flight vehicle engine comprising:
    (a) an inlet including: (1) an upper member having a generally caret-shaped lower surface portion for producing a first generally two-dimensional wedge flow below said lower surface portion, (2) a lower member having two inverted and transposed generally semi-caret-shaped upper surface portions for producing a second generally two-dimensional wedge flow above said upper surface portions, and (3) an aft portion connecting together said upper and lower members and having an orifice defining an engine inlet throat;
    (b) a combustion chamber serially connected to said aft portion of said inlet;
    (c) a plurality of fuel injectors disposed in said combustion chamber; and
    (d) an exhaust nozzle serially connected to said combustion chamber and having generally symmetric upper and lower segments which together produce generally zero pitch moment.

9. A hypersonic flight vehicle comprising:
    (a) an engine with
        (1) an inlet including: an upper member having a generally caret-shaped lower surface portion for producing a first generally two-dimensional wedge flow below said lower surface portion, a lower member having two inverted and transposed generally semi-caret-shaped upper surface portions for producing a second generally two-dimensional wedge flow above said upper surface portions, and an aft portion connecting together said upper and lower members and having an orifice defining an engine inlet throat, (2) a combustion chamber serially connected to said aft portion of said inlet;

(3) a plurality of fuel injectors disposed in said combustion chamber; and (4) an exhaust nozzle serially connected to said combustion chamber and having generally symmetric upper and lower segments which together produce generally zero pitch moment, said upper and lower segments each having an aft flap for pitch maneuver control; and (b) two swept wings attached to said lower member of said inlet of said engine, said wings having means for yaw and roll maneuver control.

10. The hypersonic flight vehicle of claim 9, also including:

(c) a conformal fuel tank disposed at least partially within said exhaust nozzle.

* * * * *